United States Patent [19]

Greenawalt et al.

[11] Patent Number: 4,463,542

[45] Date of Patent: Aug. 7, 1984

[54] METHOD FOR FORMING HEAT SEALS

[75] Inventors: Eddie L. Greenawalt; Steve C. Ray, both of Lake Jackson; Daniels S. Garner, Richwood, all of Tex.

[73] Assignee: Package Machinery Company, East Longmeadow, Mass.

[21] Appl. No.: 356,970

[22] Filed: Mar. 10, 1982

Related U.S. Application Data

[62] Division of Ser. No. 129,968, Mar. 13, 1980, Pat. No. 4,350,003.

[51] Int. Cl.³ ............................................. B65B 51/20
[52] U.S. Cl. ...................................... 53/479; 156/251
[58] Field of Search ................. 53/373, 379, 450, 548, 53/449, 550–555, 477, 479, 375, 451; 239/562; 251/62, 63; 156/251, 515, 273, 497, 499, 510, 250, 251; 219/243, 373

[56] References Cited

U.S. PATENT DOCUMENTS

| | | | |
|---|---|---|---|
| 475,244 | 5/1892 | Miller | 239/562 X |
| 2,517,206 | 8/1950 | Houghton et al. | 239/562 X |
| 2,796,080 | 6/1957 | Presnell | 251/63 X |
| 4,106,261 | 8/1978 | Greenawalt | 53/449 |
| 4,109,792 | 8/1978 | Greenawalt et al. | 53/450 X |

Primary Examiner—Horace M. Culver
Attorney, Agent, or Firm—McCormick, Paulding & Huber

[57] ABSTRACT

In a bagging machine for producing industrial bags, an improvement comprising a sealing head compartmented on the back side, and included is a plate valve to block at least certain of the compartments during the initial part of the sealing cycle. During the sealing cycle, a heated air stream exiting from the sealing head is controllably channeled to occur at defined regions, e.g., opposite the bag gussets and lap seam, and then by opening the valve, the channeling is terminated and heat is applied uniformly to complete the bag end sealing.

2 Claims, 3 Drawing Figures

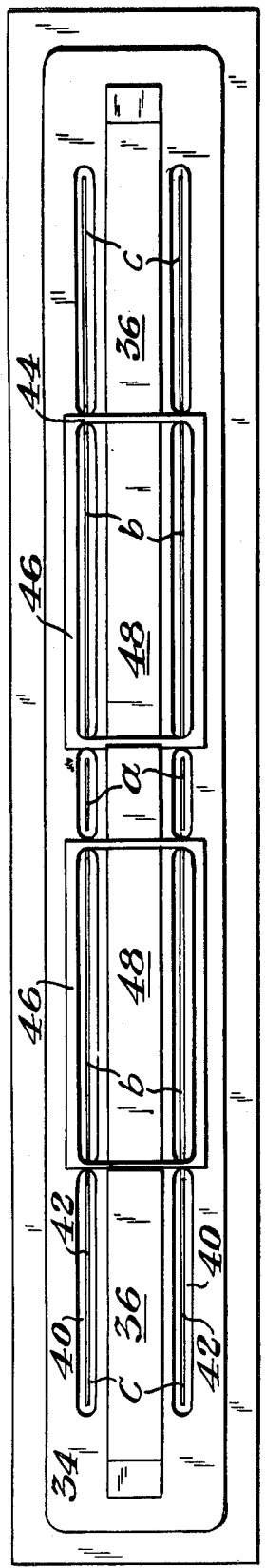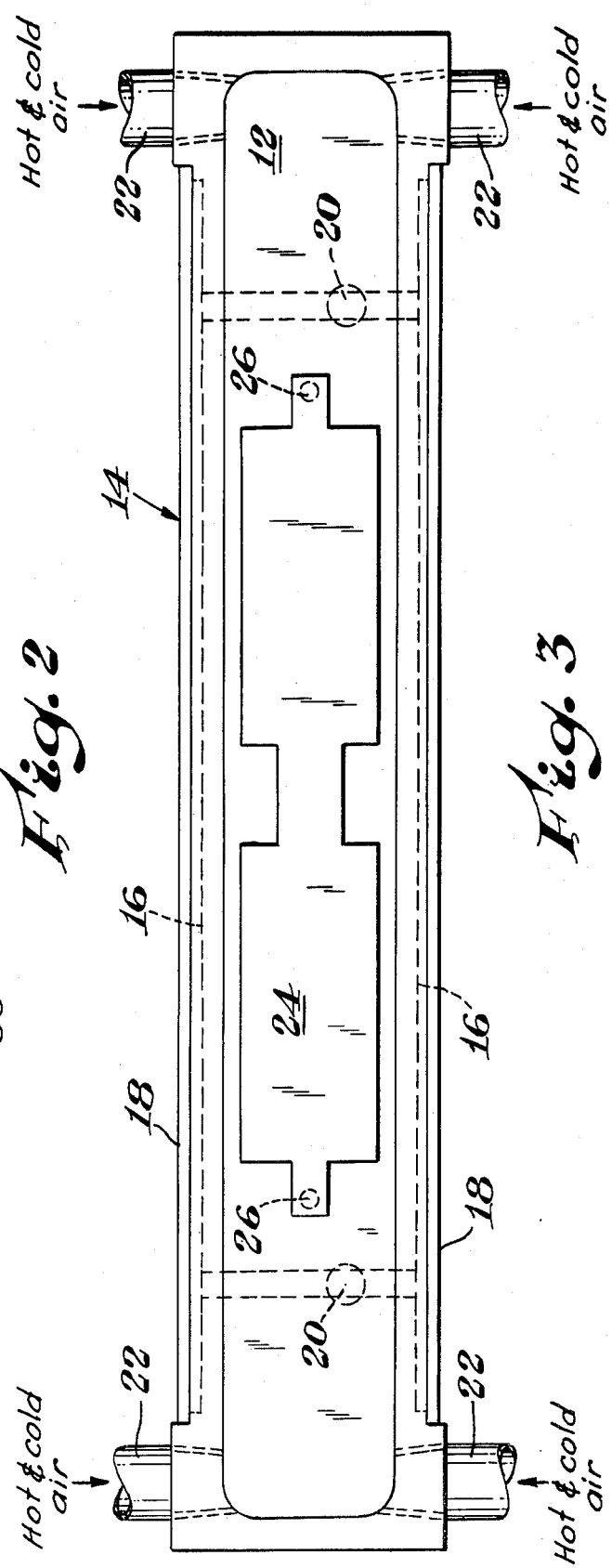

METHOD FOR FORMING HEAT SEALS

This application is a division, of application Ser. No. 129,968, filed Mar. 13, 1980 now U.S. Pat. No. 4,350,003.

FIELD OF THE INVENTION

The invention relates to a method and apparatus for forming the end seals on industrial size bags during the manufacture and filling thereof by form, fill and seal methods. The invention particularly relates to an improved sealing head having elongated slits which are fed pressurized heated air by way of compartments which may be sequentially opened and closed in order to vary the flow rate along the length of the slits.

The prior art field to which the invention is primarily applicable concerns the form, fill and sealing of bags by the general method and apparatus described in U.S. Pat. Nos. 4,106,261 and 4,109,792, the disclosures of which are incorporated herein by reference. Because the sealing method employs long narrow slits to form the bag end seals, e.g., 12-24 inches in length, irregular bag sealing can result because of uncontrolled surging and/or channeling of the heated air stream exiting from the slits. Even where there is the production of a uniform sealing air stream there is, nevertheless, a possibility of overheating the thin sections of the bag, while underheating thicker sections, thus resulting in possible seal imperfections such as pronounced seal weakness.

It is, accordingly, the objective of the invention to provide improved control in forming the end seals in the production of form, fill and seal industrial bags. It is particularly the objective of the invention to provide means for controllably varying the flow characteristics of the sealing stream in order to form superior end seals in bags produced by form, fill and seal methods and apparatus.

THE INVENTION

The invention relates to a gas sealing head of the general type comprising an elongated sealing face defining elongated slits communicating with a plenum for receiving pressurized gas to be emitted generally uniformly from said slits for forming bag end seals in producing form, fill and seal bags, the improvement which comprises, means forming compartment means within said plenum by way of which pressurized gas is fed from said plenum to the slits, said compartment means defining valve seat means, a moveable valving means within said plenum and which is seatable with said valve seat means to at least partially block pressurized gas from flowing from said plenum to said compartment means whereby flow emitting from the slits is generally controllably channeled or uniform along the length of the slits depending on the valving position of said valving means.

The invention further relates to the improved method for forming heat seals across the width of a tube work product in the process of converting the tube into filled bags, the tube having longitudinally extending side gussets and a lap seam, the method comprising the steps of clamping the tube along first and second zones spaced in the longitudinal direction, parting the tube transversely along a line between and remote from said clamped zones, separating the parted edges, applying high velocity heated gas streams preferentially to the portions of the parted edges, respectively, which are generally coextensive with said gussets and lap seam, in sequence with the above, applying high velocity heated gas streams preferentially to said parted edges which streams are generally uniform in flow across the transverse extent of said edges, thereafter terminating said flow of heated gas and positively cooling said parted edges prior to releasing the clamping pressure.

THE DRAWING

Further objects, aspects, and advantages of the invention will in part be pointed out and in part apparent from the following more detailed description considered together with the accompanying drawing in which:

FIG. 2 is a sectional view along section line 2—2 of FIG. 1, and shows particularly the compartments on the back of the sealing face element of the hot gas sealing head; and FIG. 3 is a sectional view along section line 3—3 of FIG. 1, and shows the detail of the valving member within the plenum.

DETAILED DESCRIPTION OF THE DRAWINGS

Figure 1:
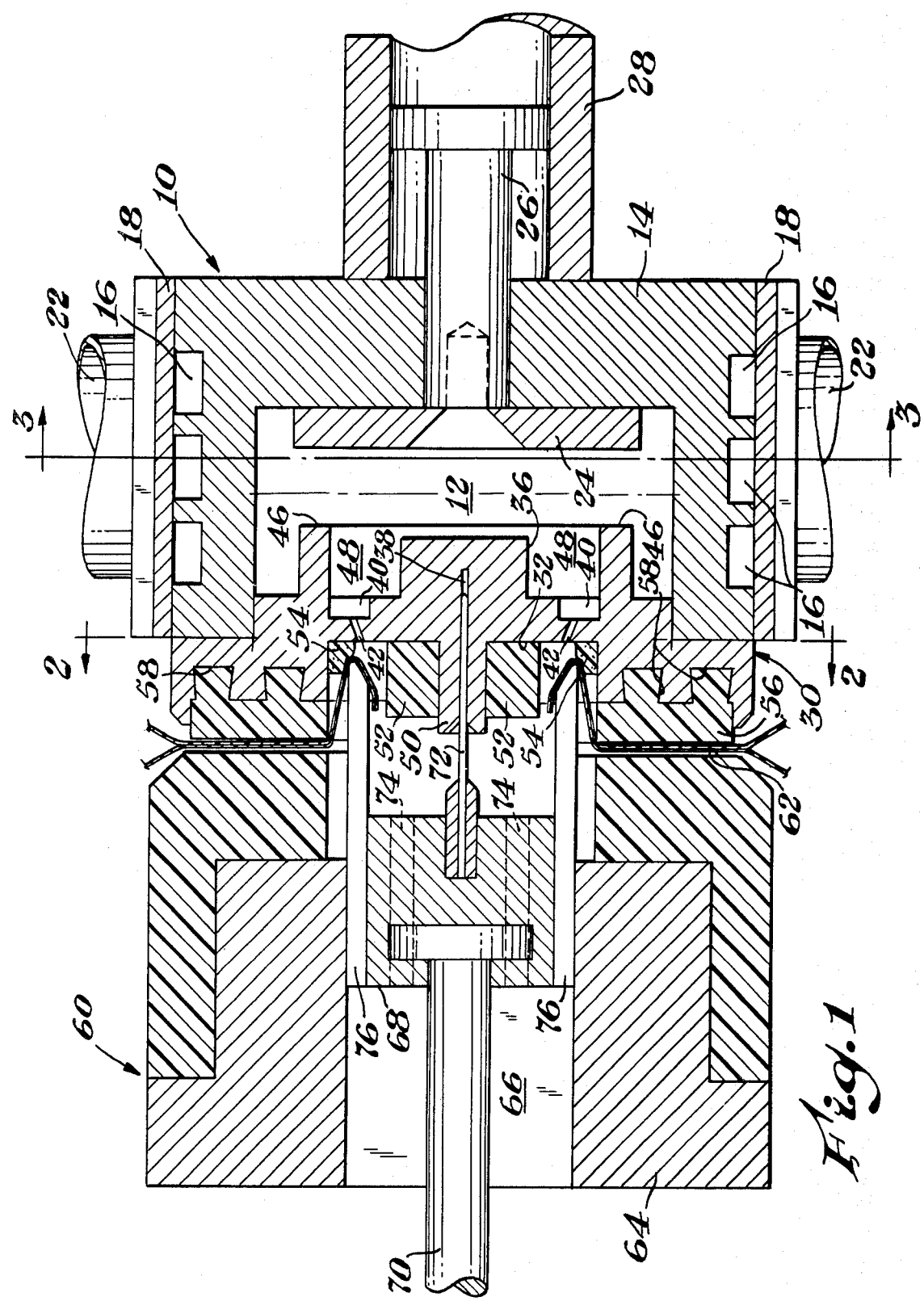
FIG. 1 is a cross-sectional view of mated sealing heads constructed according to the principles of this invention.

Referring to FIG. 1, the gas sealing head, designated by reference numeral 10, includes an elongated plenum or plenum chamber 12. The plenum is within an elongated holder or block 14. The block is cooled by water circulated through multiple passages 16 defined underneath plates 18 attached to the top and lower surfaces, respectively, of block 14. Passages 16 communicate with port means 20 for inlet and outlet of the cooling water (see additionally FIG. 3). Additionally, four entry ports or port means 22 are provided for supplying sequentially heated and thereafter cooling, e.g., ambient temperature gas or air to plenum 12. Moveable within the plenum is a valving member or means 24, preferentially a plate valve. The plate valve moves reciprocally by means of attachment to the piston arms 26 of a pair of pneumatic cylinders or pistons 28 that, in turn, are affixed to the back wall of block 14.

Inset in block 14 is an elongated sealing head element 30 which extends directly adjacent to plenum 12. Sealing head element 30, preferably of machined aluminum, defines a sealing face 32, which is outwardly of plenum 12, and a stepped or configured inner face 34, which communicates directly with plenum 12. Inner face 34 defines a central elongated step 36 which, in turn, defines an elongated knife well 38. On each side of step 36, there is defined an aligned series of shallow elongated depressions 40, in which are cut slits 42, communicating between plenum 12, and sealing face 32. The series of slits considered totally form a pair of elongated and parallel sealing slits, each being continuous except for narrow lands 44 spaced along the length of the slits and forming interruptions therein. The slits may each be considered to comprise distinct segments composed of a middle segment "a" positioned to be juxtaposed with the lap seam of the tube work product; segments "b" which are intermediate segments; and segments "c" which are positioned outermost and thus are adapted to be juxtaposed with the side gussets of the tube (to be sealed). The intermediate segments b are contained within the periphery of generally rectangular and raised valve seats or seat means 46. The raised valve seats are mateable with valve plates 24, to provide compartment means 48 by way of which gas is fed from plenum 12 to slit segments b, or is blocked depending on the valving position. In contrast, slit segments a and c communicate with plenum 12, irrespective of the position of valve plate 24.

In reference to sealing face 32, the same defines a raised central rib 50 which comprises a part of knife well 38, and which is bordered on each side by spacers 52, preferably formed of glass impregnated Micarta. Outwardly of spacers 52 are slits 42 which open to the sealing face; and outwardly thereof are gasket strips 54 of a resilient gasket material, preferably a room temperature vulcanizing (RTV) silicone foam rubber of about 20—30 durometer hardness, the purpose of which, together with spacers 52, is described further hereinafter. Immediately outwardly of strips 54 is a seating gasket 56 forming a peripherally continuous clamping face and which is affixed in grooves 58 defined in sealing head element 30. The seating gasket 56 may be formed by casting preferably using a RTV high temperature silicone rubber of about 80 durometer hardness.

The opposite sealing head or knife head 60 includes a peripherally continuous clamping or mating face 62, preferably formed of Micarta, and which is inlaid in mold block 64, which is preferably of aluminum. Mold block 64 defines an elongated cavity 66 in which is contained a knife holder 68, which moves reciprocally by means of attachment to plural piston arms 70 of pneumatic pistons or cylinders. Affixed in holder 68 is a preferably scalloped edged, textile cutting blade or knife 72. Exhaust ports 74 are defined by the knife holder on each side of blade 72. In addition, affixed to the knife holder, outwardly of the exhaust ports, are detents or detent elements 76 which extend forwardly in spaced parallel relationship with the cutting blade.

OPERATION

The sealing heads may be designed to move continuously, or be mounted in a carriage which is conveyed reciprocally, both designs being shown in the referenced patents. Assuming the latter design, the heads are conveyed to a predetermined upper position, and are closed across the tube work product, clamping the same. The clamping pressure firmly seats seating gasket 56 against the mating face of mold block 64, forming an essentially gas tight seal therewith along parallel clamping zones that extend transversely across the width of the tube, and which are separated in the longitudinal direction.

Almost simultaneously with the clamping of the tube, the pneumatic cylinders operating the knife holder may be activated, forcing blade 72 forward and cutting the tube transversely at a position between and remote from the clamped areas. Simultaneously, detents 76 draw the parted edges or cut ends of the tube apart and away from the knife well, as the blade moves to the extreme forward position, thereby separating and defining a space between the cut ends which communicates with exhaust ports 74. Spacers 52, in the final forward position, are juxtaposed with detents 76 restricting the rate at which gas can be exhausted therebetween, and thus influencing the dwell time of the heated gas in contact with the parted edges. Preferably, the space between detents 76 and spacers 52, respectively, is on the order of about 1/16 of an inch.

In addition, gasket strips 54 preferably make very light touching engagement with the tube, which is thus lightly sealed between gasket strips 54 and detents 76. Accordingly, the temporary seal formed isolates the clamped zones from hot air issuing from the slits, thus assisting to preferentially heat only the parted edges, and thus maintaining relatively cool the portions of the tube which are disposed immediately adjacent to the clamped zones.

During the initial part of the sealing cycle, plate valve 24 is seated with valve seats 46. Pressurized heated air, fed into the plenum, through port air inlets 22, is channeled through slit segments a and c thus initially applying heat selectively to the parted edges generally coextensive with the gussets and lap seam. Part way through the sealing cycle, pneumatic cylinders 28 are operated to unseat the plate valve, and supply heated gas to the slit segments b. A hot gas stream is thus formed of generally uniform flow, which strikes the parted edges across the transverse extent thereof, and is removed by way of the route between detents 76 and spacers 52, and thereafter through exhaust ports 74 to atmosphere. The step is continued until sufficient BTU's are applied to form a strong seal, after which cooler air is supplied to the plenum to apply high velocity cooling air to the parted edges, to cool the seals sufficiently to permit the clamping pressure to be removed. As may be noted, the lower seal is a closure of the bag last filled, while the upper seal forms the bottom of the next bag in the sequence, in accordance with the known sequence of steps of the prior art.

What is claimed is:

1. The improved method for forming heat seals across the width of a tube work product in the process of converting the tube into filled bags, the tube having longitudinally extending side gussets and a lap seam, each of which forms a longitudinal region of increased thickness in the tube due to the plurality of plies therein, the method comprising the steps of clamping the tube along first and second zones transverse of the tube and spaced from one another in the longitudinal direction, parting the tube transversely along a line between and remote from said clamped zones and extending across the width of the tube through the increased thickness regions and the other regions, separating the parted edges, applying high velocity heated gas streams to the parted edges at the increased thickness regions for one period of time, applying high velocity heated gas streams to said parted edges at the other regions for another period of time less than said one period of time, and, thereafter terminating said flow of heated gas and positively cooling said parted edges prior to releasing the clamping pressure.

2. The method of claim 1 including the step of positively cooling said parted edges by applying high velocity cooling gas streams thereto prior to releasing the clamping pressure.

* * * * *